United States Patent [19]
Creel et al.

[11] Patent Number: 6,115,134
[45] Date of Patent: Sep. 5, 2000

[54] SCAN LINE SPLITTING IN A MULTI-STAGED IMAGE PROCESSING PIPELINE

[75] Inventors: Christopher Creel; Dana A. Jacobsen, both of Boise, Id.

[73] Assignee: Hewlett-Packard Company, Palo Alto, Calif.

[21] Appl. No.: 08/985,579

[22] Filed: Dec. 5, 1997

[51] Int. Cl.[7] .................................................. G06K 15/00
[52] U.S. Cl. ........................................ 358/1.16; 358/1.17
[58] Field of Search .................................... 395/101, 109, 395/113–116; 345/506, 507, 509, 511, 521, 525, 526, 196, 197; 358/404, 444, 1.1, 1.13, 1.14, 1.15, 1.16, 1.17, 1.9; 382/277, 282

[56] References Cited

U.S. PATENT DOCUMENTS

| | | | |
|---|---|---|---|
| 5,448,301 | 9/1995 | Michener | 348/578 |
| 5,687,302 | 11/1997 | Kawase | 395/115 |
| 5,710,873 | 1/1998 | Romano et al. | 395/115 |
| 5,758,043 | 5/1998 | Takizawa et al. | 395/115 |
| 5,761,347 | 6/1998 | Chan et al. | 382/270 |
| 5,796,930 | 8/1998 | Gauthier et al. | 395/116 |
| 5,801,716 | 9/1998 | Silverbrook | 345/506 |
| 5,802,600 | 9/1998 | Smith et al. | 711/173 |
| 5,852,443 | 12/1998 | Kenworthy | 345/431 |
| 5,852,742 | 12/1998 | Vondran, Jr. et al. | 395/800.28 |
| 5,870,535 | 2/1999 | Duffin et al. | 395/115 |

*Primary Examiner*—Arthur G. Evans
*Attorney, Agent, or Firm*—Lane R. Simmons

[57] ABSTRACT

A multi-staged image processing pipeline in a page printer includes a splitter stage for splitting a scan line of print data into sections for improved formatting efficiency and speed in the pipeline. In a preferred embodiment, the splitter stage forces a section of the scan line data to be processed by all relevant image processing stages with reduced cache thrashing. Each section of scan line data is set to be of a size that is optimal for (i.e., not greater than) the cache memory available. Advantageously, the splitter provides dynamically configurable splitter sizing and enables each stage to work on the data that is currently in the cache.

20 Claims, 4 Drawing Sheets

SCAN LINE SPLITTING IN A MULTI-STAGED IMAGE PROCESSING PIPELINE

FIELD OF THE INVENTION

This invention relates in general to image forming devices and, more particularly, to improved memory management in a page printer.

BACKGROUND OF THE INVENTION

The image processing pipeline of a printer performs a number of operations upon print data in preparation for printing. These operations include, for example: print data compression, print data decompression, color space conversion, expansion, halftoning, clipping, scaling, rotation and the like. The type of operation performed and the specific order in which the operations will be performed can vary depending upon the type of print data which enters the pipeline, the capabilities of the print engine, and the memory available in the printer. The types of print data which may enter the pipeline include: text, line art, images, and graphics.

In conventional pipeline implementations, the various printing operations are performed by a microprocessor under the control of firmware. Depending upon the type of print data entering the pipeline and the operations necessary to process the print data, a number of possible firmware routines are executed to complete the print data processing operations. Alternatively, some operations may be embedded in an Application Specific Integrated Circuit (ASIC). In any case, the image processing pipeline is often referred to as the "image processor" for the printer, whether it is designed as a large "single" function call entity or as multiple functional entities.

As printers increase in density of dot placement (dots per inch), add gray scale capability (using a set of bits per pixel to define a gray scale level), and include color printing capability (requiring additional bits per pixel over monochrome printing), the time required for the pipeline to process the print data becomes substantial. For example, in color printing the memory required to store the data used to print a page can reach thirty two times or more the memory required for a monochrome printer of the same resolution. To fully utilize the printing speed capabilities of the print engine, the pipeline must have the capability to process print data sufficiently fast to supply a continuous stream of print data to the print engine, thereby allowing the print engine to continuously print throughout the print job.

As previously mentioned, conventional data pipelines have been implemented using general purpose microprocessors. Although microprocessors have the versatility to be programmed to perform the operations of the data pipeline, the amount of cache memory associated with any given microprocessor generally directly increases the speed for performing these operations. In other words, the more the available cache, the better potential performance throughput. However, typically, microprocessors with more cache are more costly than those with less cache. Therefore, in efforts to cut costs, a smaller cache in a microprocessor is often the forced result for a low cost printer, but, generally, some cache is always better than none.

The microprocessor's cache is a specific area of memory generally used for quick access needs. A typical use is to store a scan line of print data for image processing operations. A scan line of print data is a one dimensional array of pixel data, and may include up to as much pixel data as spans across a sheet of paper—depending upon the object to be imaged in the print data. For example, a "longrule" is an object which extends across an entire page width, typically about 4500 pixels (or about 1100 words, assuming four pixels per word and eight bit pixels). Unfortunately, however, a smaller cache doesn't always hold an entire scan line of print data—depending upon the cache size and the imaging operations being performed. This is undesirable because most staged image processors perform multiple passes on a scan line. The problem is that if an object's scan line is too large to fit in the cache, as each stage of the image processor moves along the scan line (executing operations on the print data objects), the cache must throw out the data least recently used (i.e., previous data from the scan line) to enable loading of more current data. Similarly, each additional stage (image processing operation) repeats the same pattern until all stages have completed their formatting for the full scan line of data. As such, when a long scan line of data is conventionally image processed in a smaller cache memory, the overall efficiency and speed of the image processor is detrimentally affected due to the inherent cache thrashing (continuous reloading of data).

Accordingly, an object of the present invention is to provide an improved image processing mechanism and method, especially for a limited cache memory environment.

SUMMARY OF THE INVENTION

According to principles of the present invention in a preferred embodiment, a multi-staged image processing pipeline in a page printer includes a splitter stage for splitting a scan line of data into sections for improved formatting efficiency and speed in the pipeline. In a preferred embodiment, the splitter stage forces a section of the scan line data to be processed by all image processing stages with reduced cache thrashing. Each section of scan line data is set to be of a size that is optimal for the cache memory available. Advantageously, the splitter enables each stage to work on the data that is currently in the cache. Additionally, the splitter provides dynamically configurable splitter sizing for optimal cache matching and reduced cache thrashing.

Other objects, advantages, and capabilities of the present invention will become more apparent as the description proceeds.

DETAILED DESCRIPTION OF THE INVENTION

Figure 1:
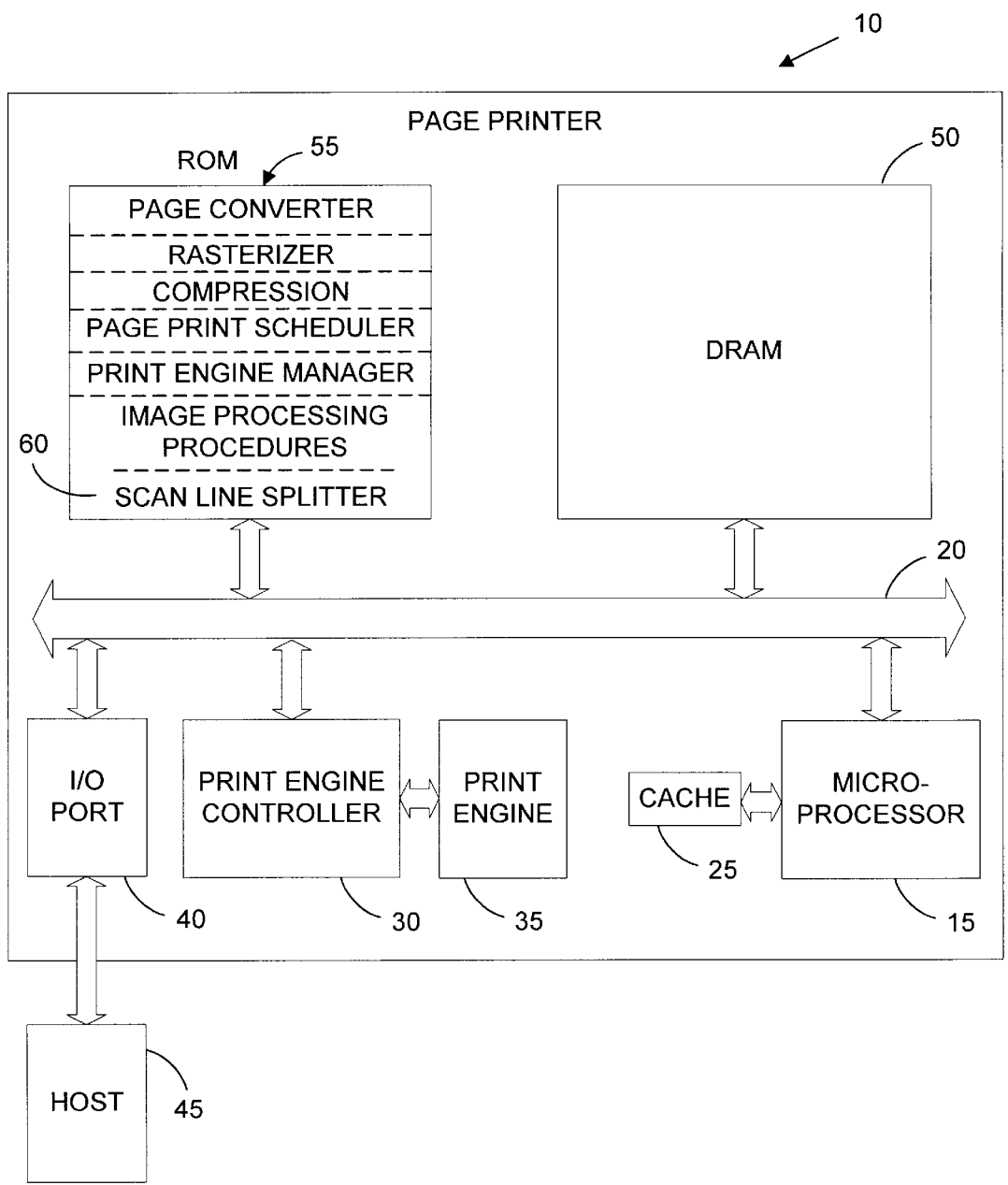
FIG. 1 is a block diagram of a printer embodying the present invention scan line splitter mechanism and method.

FIG. 1 is a high level block diagram of a page printer 10 incorporating the present invention scan line splitting mechanism and method for a multi-stage image processing pipeline. Page printer 10 is controlled by a microprocessor 15 which communicates with other elements of the system via bus 20. Microprocessor 15 includes cache memory 25. A print engine controller 30 and associated print engine 35 connect to bus 20 and provide the print output capability for the page printer. For purposes of this disclosure, print engine 35 is a laser printer that employs an electrophotographic drum imaging system, as well known in the art. However, as will be obvious to those of ordinary skill in the art, the present invention is similarly applicable to other types of printers and/or imaging devices including, for example, inkjet printers, facsimile machines, copiers, or the like.

An input/output (I/O) port 40 provides communications between the page printer 10 and a host computer 45 and receives page descriptions (or raster data) from the host for processing within the page printer. A dynamic random access memory (DRAM) 50 provides a main memory for the page printer for storing and processing a print job data stream received from host 45. A read only memory (ROM) 55 holds firmware which controls the operation of microprocessor 15 and page printer 10. Code procedures stored in ROM 55 include, for example, a page converter, rasterizer, compression code, page print scheduler and print engine manager. The page converter firmware converts a page description received from the host to a display command list, with each display command defining an object to be printed on the page. The rasterizer firmware converts each display command to an appropriate bit map (rasterized strip or band) and distributes the bit map into memory 50. The compression firmware compresses the rasterized strips in the event insufficient memory exists in memory 50 for holding the rasterized strips.

In general, the operation of page printer 10 commences when it receives a page description from host computer 45 via I/O port 40 in the form of a print job data stream. The page description is placed in DRAM 50 and/or cache 25. Microprocessor 30 accesses the page description, line by line, and builds a display command list using the page converter firmware in ROM 55. As the display command list is being produced, the display commands are sorted by location on the page and allocated to page strips in memory 50. When a page is closed for processing (i.e., all strips have been evaluated, rasterized, compressed, etc. for processing by print engine 35) then the rasterized strips are passed to print engine 35 by print engine controller 30, thereby enabling the generation of an image (i.e., text/graphics etc). The page print scheduler controls the sequencing and transferring of page strips to print engine controller 30. The print engine manager controls the operation of print engine controller 30 and, in turn, print engine 35.

ROM 55 also includes other image processing procedures for generating an image from a print job data stream, including for example, a color space conversion procedure, halftoning, clipping, scaling, and rotating procedures to name a few. Together, these procedures make up the image processing pipeline or "image processor" for printer 10 (see FIG. 4). Each image processing procedure is referred to herein as a "stage" in the image processing pipeline for acting upon print image data. Thus, a multi-stage image processor is employed whereby sequential image processing may occur.

Importantly, ROM 55 further includes a scan line splitter 60 according to the present invention. In a preferred embodiment, scan line splitter 60 is also a stage in the image processor as will be described more fully herein. Scan line splitter 60 divides a scan line of print data into "sections" (or portions) and controls the image processor to act upon each "section" of print data such that the section is not removed from cache 25 until all of the stages that are designated to work upon that section have completed their image processing operations. Advantageously, this enables each of the stages to work on the print data while the data is still in the cache and avoids cache thrashing for formatting operations between stages. Essentially, scan line splitter 60 takes responsibility for bringing into the cache new scan line data, thus improving overall efficiency and speed of the image processing pipeline operations.

Figure 2:
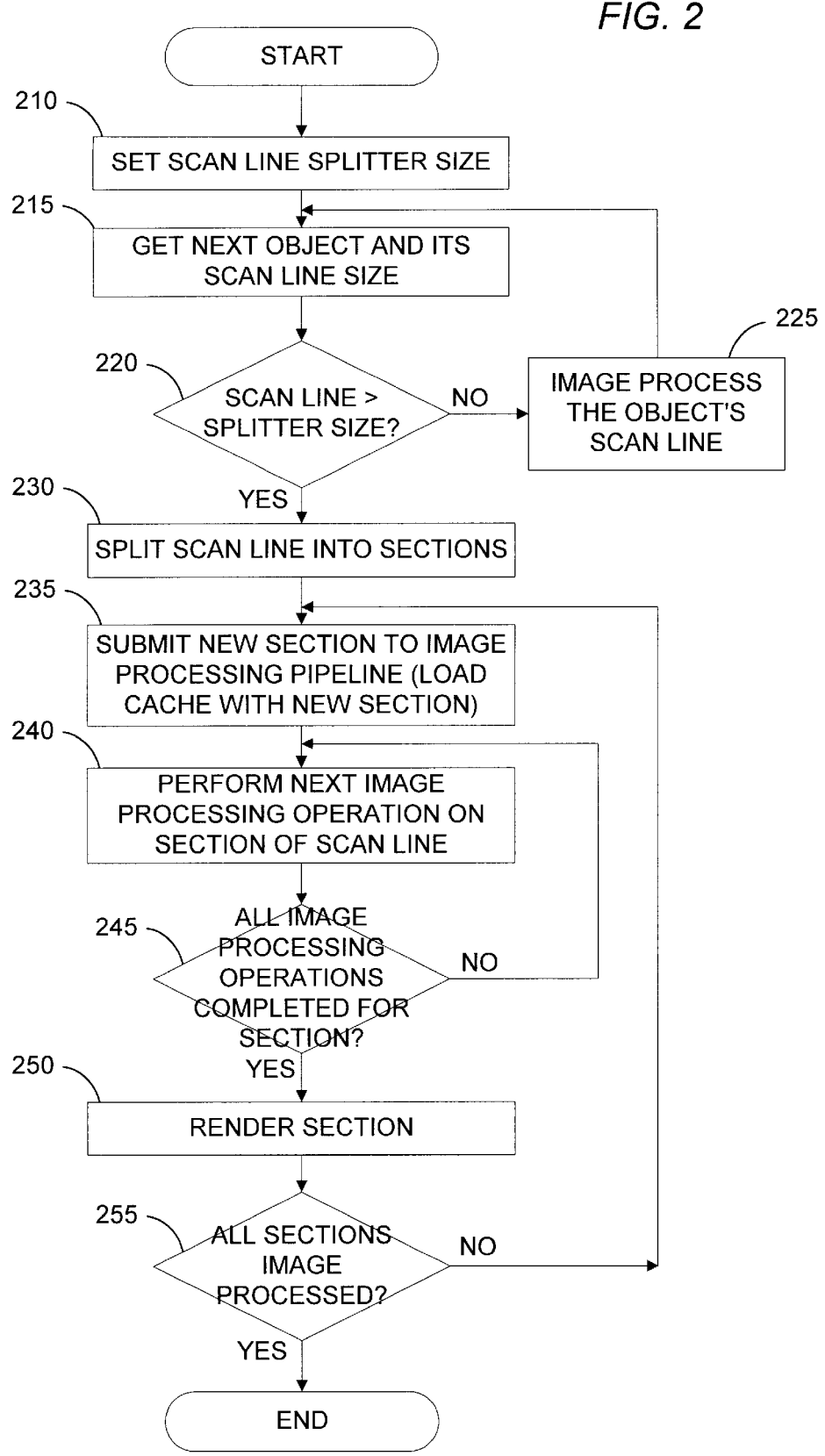
FIG. 2 is a flow chart depicting a preferred method of the present invention.
Figure 3:
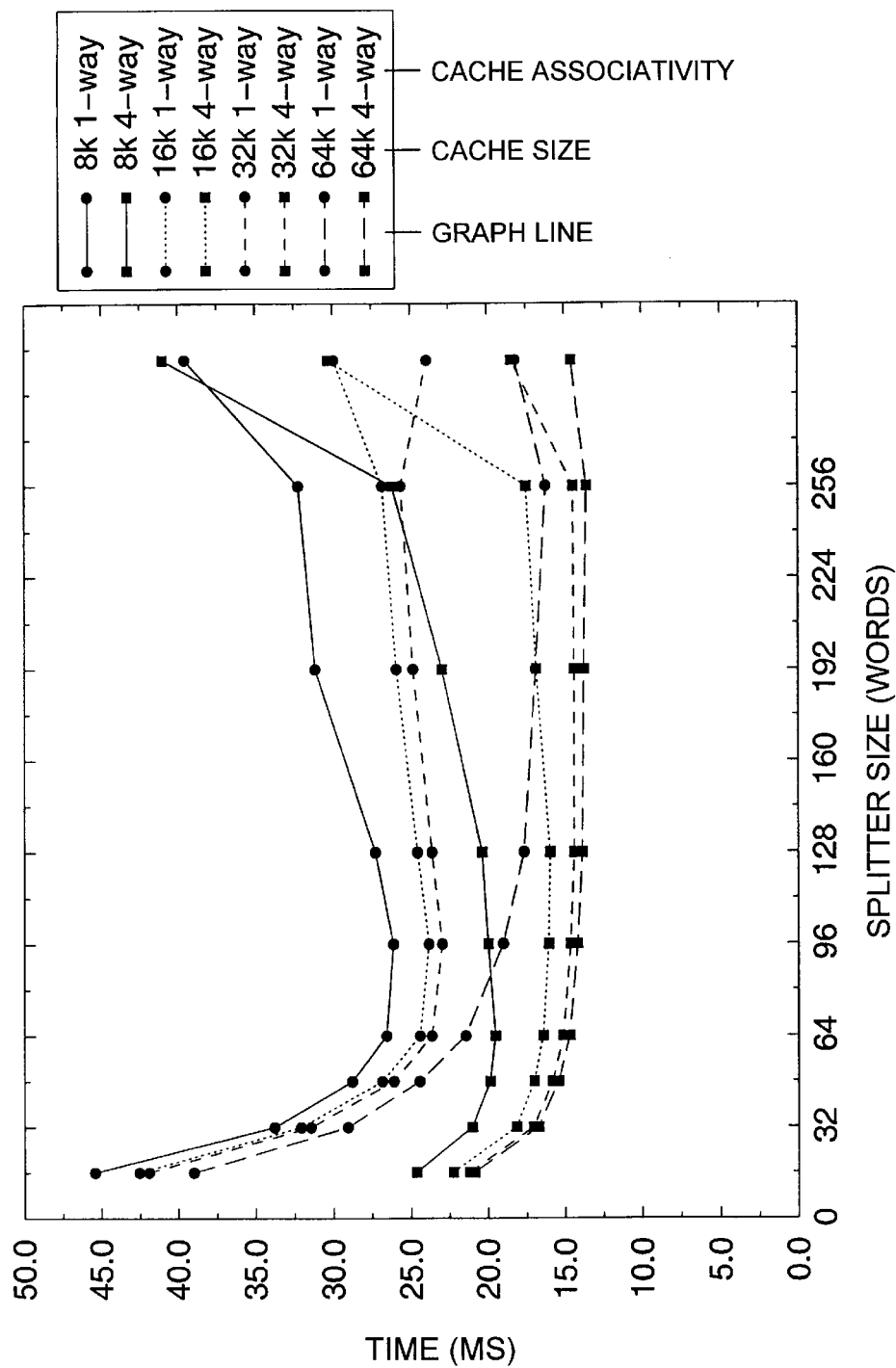
FIG. 3 is a graph depicting simulated timing results for image processing a longrule using various splitter sizes under the present invention.

FIG. 2 is a flowchart depicting a preferred method of the present invention for scan line splitting in a multi-stage image processor. First, 210, the scan line splitter size is set. In a preferred embodiment, the splitter size is set upon system power up (of page printer 10). For example, upon power up, an evaluation is made of what type of microprocessor 15 is employed in printer 10 to thereby determine cache size 25 and associativity. After assessing the cache configuration, the splitter size is set either by static reference (i.e., hard coded) or, preferably, by dynamic evaluation. With respect to a dynamic evaluation, for example, FIG. 3 is a graph depicting simulated timing results for image processing of a longrule using various splitter sizes under the present invention in connection with several exemplary cache memory configurations. The legend identifies each graph line representation for a specific cache memory size (in kilobytes) and cache associativity (one-way or four-way). Each graphed line represents the amount of time (in milliseconds) that it took to image the longrule using varying splitter sizes (in words). The samples begin with a splitter size of 16 words on the left of the graph, and end with a splitter size of 256 words on the right of the graph. At the far right, beyond the 256 word splitter size, the graphed lines represent configurations generally without a splitter of the present invention.

Overall, the graph of FIG. 3 clearly depicts that a preferred splitter word size for several of the configurations shown is about 64 words. As seen, a smaller word size quickly worsens (increases) imaging time due to the overhead of processing many smaller words over multiple scan lines. A larger word size also often gradually increases imaging time due to cache thrashing (although each case is different). Additionally, it can be seen that the most significant improvements (decreases) in imaging time are found in the one-way associativity cache configurations at about the 64 word splitter size.

Thus, using simulated results as depicted in the graph of FIG. 3, and referring again now to the flowchart of FIG. 2, block 210, a scan line splitter size is dynamically selected depending upon a given system configuration of cache size and associativity. For example, a lookup table incorporating the results of FIG. 3 may be employed for dynamically selecting a preferred splitter size configuration.

Subsequent to setting the scan line splitter size, 210 (i.e., after power up), upon receipt of a print data stream for image processing a next object is obtained and its scan line size is evaluated 215. If the scan line size is less than the splitter size 220, then the object is image processed 225 without splitting its scan line. This is because, most likely, the object's entire scan line fits in the cache memory and will not need to be thrown out as between any two image processing operations in the pipeline. Thus, it should automatically process efficiently and quickly through the pipeline.

If the object's scan line size exceeds the splitter size threshold 220, then the scan line is split into splitter size sections 230 (or it could be said that at least a first splitter size section of the scan line is obtained), and the first (current) section is submitted to the image processor pipeline 235 for formatting. By system default (usually hardware dictated), the current section is loaded into the cache 25 for processing by the pipeline.

Subsequently, the next image processing operation is performed 240 on the current section of scan line data. This operation may be any one of the numerous stages in the image processor, such as compression, decompression, color space conversion, expansion, halftoning, clipping, scaling, rotation and the like. Once that stage's formatting is complete for this current section of the scan line, if there are further image processing operations to perform (i.e., other stages) 245, then the cycle is repeated 240, 245 and each stage executes its formatting on the current section at hand until all operations are completed 245. In this manner, the current section of data being processed has a significantly improved chance of remaining in the cache memory 25 and not being discarded. However, since each stage's formatting operations may load other data into the cache for enabling processing of the current scan line section, it is possible that at some point the current section may actually become the least recently used segment of data in the cache and, consequently, be overwritten, thus requiring a reload at a later time. However, the chances of this occurring are minimized under the present invention because of the splitter size having been optimally selected (210) per the simulated evaluations (FIG. 3).

Once all operations are completed for the current section 245, then rendering for that section has been completed 250 and it is stored in memory 50. If, at this point, the entire scan line for the object has not been completely formatted (i.e., there are more "sections" to format) 255, then a next "current" section of the current scan line of print data is obtained and submitted to the pipeline for continued image processing 235. Again, all image processing operations are performed on this next section 240 and 245 so that rendering for this section is also completed 250.

These steps of getting a section of the scan line (230, 235) and image processing the section (240, 245, 250) are repeated until all sections of the scan line have been processed 255. In this manner, the scan line of image data is formatted with improved overall efficiency and speed because cache thrashing is minimized for scan line data being processed.

Figure 4:
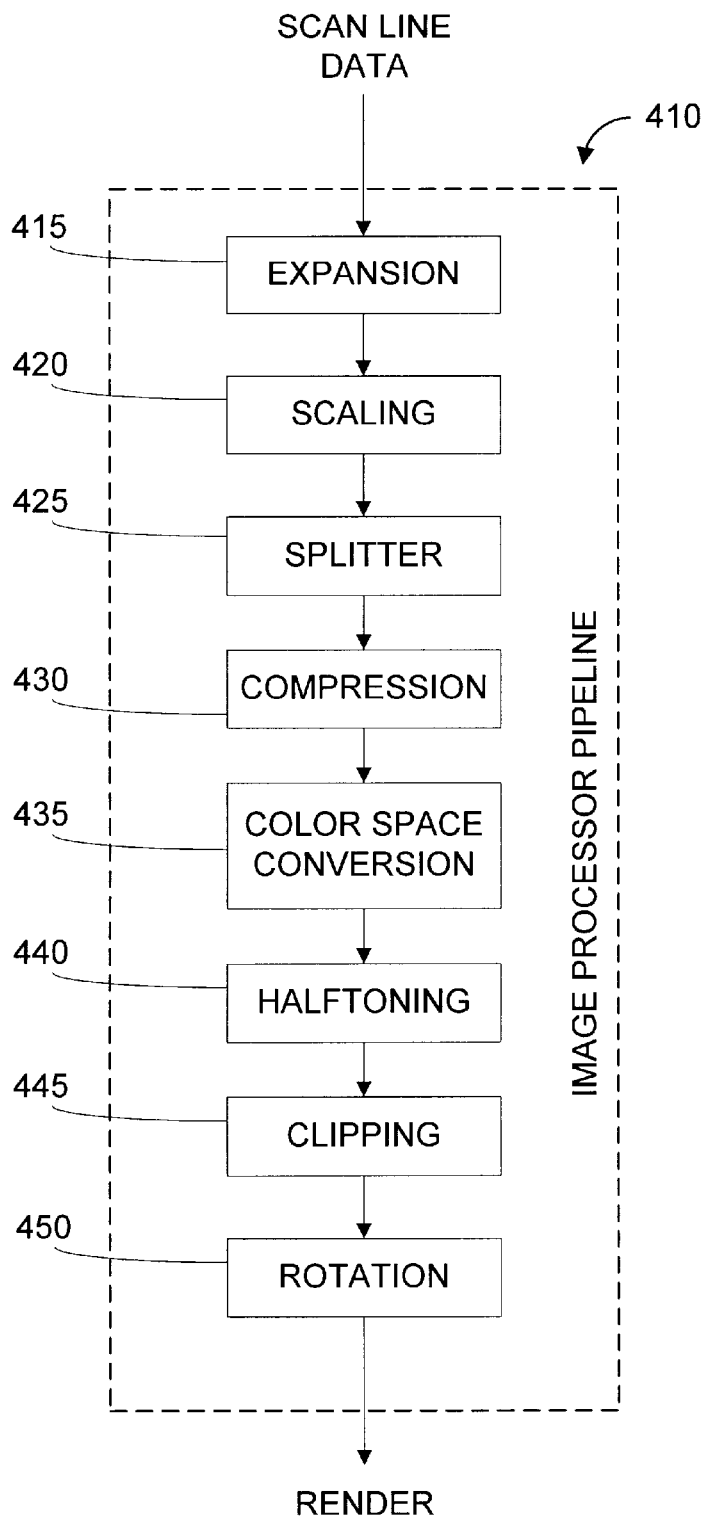
FIG. 4 is a block diagram of an image processing pipeline embodying the present invention.

It should be noted here that although the steps in FIG. 2 which perform the scan line size evaluation and section splitting (220, 230 and 235) are identified separate from the other "image processing operation" steps (240, 245 and 250), in a preferred embodiment the scan line size evaluation and section splitting is in fact an early stage within the image processing pipeline. For example, FIG. 4 depicts this preferred implementation in block diagram. Namely, FIG. 4 is a block diagram of an image processing pipeline 410, having exemplary image processing stages including an expansion stage 415, a scaling stage 420, a splitter stage 425 (according to the present invention), a compression stage 430, color space conversion 435, halftoning 440, clipping 445, and rotation 450 stages. Although FIG. 4 doesn't describe all possible ordering variations (dependencies) for stages within an image processing pipeline, it does represent that some ordering dependencies are preferable. For example, the expansion and scaling stages 415 and 420 are depicted ahead of the splitter stage 425 (relative to the overall image processing data flow) to represent that it is best to have the expansion and scaling stages process the scan line data before the splitter stage. Namely, it is preferred that the splitter stage work on scan line data only after the width of that scan line data ceases to change. Although the remainder of the stages 430, 435, 440, 445 and 450 are not depicted in any particular order, they are depicted to show some of the many stages that may exist in a multi-staged image processor in connection with the present invention scan line splitter 425. However, it will be understood by those of ordinary skill in the art that these stages (and any stage) in an image processing pipeline may be dependent upon the prior processing of other stages.

Finally, what has been described are preferred embodiments for a mechanism and method for splitting a scan line of print data for improved image processing performance. It will be obvious to one of ordinary skill in the art that the present invention is easily implemented utilizing any of a variety of components existing in the art. Moreover, while the present invention has been described by reference to specific embodiments, it will be apparent that other alternative embodiments and methods of implementation or modification may be employed without departing from the true spirit and scope of the invention.

What is claimed is:

1. An image forming device, comprising:
   (a) a memory and a print engine;
   (b) an image processing mechanism configured to perform at least two image processing operations using the memory; and,
   (c) a control mechanism configured to receive pixel data originally acquired from object based information and further configured to provide only a section of a scan line of the pixel data to the image processing mechanism, whereby the section is image processed by the at least two image processing operations during or before rendering of the data by the image forming device and before a next section of the scan line is image processed by the image processing mechanism.

2. The image forming device of claim 1 wherein the section of the scan line of pixel data is of a size such that a probability is increased that the section will not be discarded from the memory until completion of execution by the at least two image processing operations.

3. The image forming device of claim 1 wherein the section of the scan line of pixel data is of a size not greater than a capacity of the memory.

4. The image forming device of claim 1 wherein the memory is a cache memory.

5. The image forming device of claim 1 wherein the at least two image processing operations are separate image processing stages of an image processing pipeline for formatting the scan line of pixel data.

6. An image forming device, comprising:
   (a) a memory and a print engine;
   (b) a multi-staged image processing pipeline, each stage configured to perform at least one image processing operation using the memory; and,
   (c) a scan line splitting mechanism configured to act upon pixel data originally acquired from object based information, and further configured to divide up a scan line of the pixel data into sections and enable all stages that are designated to act upon the print data to perform their respective image processing operations as necessary on any given one of the sections during or prior to rendering of the data by the image forming device and prior to any of the stages performing their respective image processing operations on any other of the sections.

7. The image forming device of claim 6 wherein the scan line splitting mechanism includes software, firmware, circuitry, or any combination thereof.

8. The image forming device of claim 6 wherein the scan line splitting mechanism is one of the stages of the multi-staged image processing pipeline.

9. The image forming device of claim 6 wherein the scan line splitting mechanism controls loading of the sections of data into the memory for the image processing operations stages.

10. The image forming device of claim 6 wherein each section is of a size not greater than a holding capacity of the memory.

11. The image forming device of claim 6 wherein the memory is a cache memory.

12. A method of image processing, comprising:

(a) providing a portion of a scan line of pixel data to an image processing pipeline in association with a memory, the pixel data having been originally acquired from object based information; and, (b) enabling at least two image processing operations in the image processing pipeline to operate upon the portion of print data such that the portion is image processed by the at least two image processing operations during or before rendering of the data and before a next portion of the scan line of print data is image processed.

13. The method of claim 12 wherein the image processing pipeline is a multi-staged pipeline, and wherein each stage performs at least one image processing operation using the memory.

14. The method of claim 12 wherein the portion of pixel data is of a size such that a probability is increased that the portion is not discarded from the memory during the at least two image processing operations in combination.

15. The method of claim 12 further including repeating steps (a) and (b) with respect to further portions of the scan line of pixel data until the at least two image processing operations have been performed on all portions of the scan line of pixel data.

16. The method of claim 12 wherein the portion of the scan line of pixel data is of a size not greater than a capacity of the memory.

17. The method of claim 12 wherein the memory is a cache memory.

18. A computer-readable medium having computer-executable instructions for performing steps including:

(a) providing a portion of a scan line of pixel data to an image processing pipeline in association with a memory and an imaging device, the pixel data having been originally acquired from object based information; and, (b) enabling at least two image processing operations in the image processing pipeline to operate upon the portion of print data such that the portion is image processed by the at least two image processing operations during or before rendering of the data by the imaging device and before a next portion of the scan line of print data is image processed.

19. A method of image processing in an imaging device, comprising:

(a) determining a cache memory size associated with a processor enabled for processing image processing operations for the imaging device;

(b) providing a portion of a scan line of pixel data to an image processing pipeline, the portion being of a size to fit within the determined cache memory size and the pixel data having been originally acquired from object based information; and, (c) enabling at least two image processing operations in the image processing pipeline to operate upon the portion of print data such that the portion is image processed by the at least two image processing operations during or before rendering of the data by the imaging device and before a next portion of the scan line of print data is image processed.

20. The method of claim 19 wherein the portion is image processed by the at least two image processing operations before the portion is stored into a frame buffer for output on the imaging device.

* * * * *